(12) United States Patent
Ricart

(10) Patent No.: US 11,740,849 B1
(45) Date of Patent: Aug. 29, 2023

(54) APPARATUSES AND METHODS FOR GENERATING A MODULAR DIGITAL WALL

(71) Applicant: Jersey Blanket Realms, LLC, Columbus, OH (US)

(72) Inventor: Jason Ricart, Columbus, OH (US)

(73) Assignee: Jersey Blanket Realms, LLC, Columbus, OH (US)

( * ) Notice: Subject to any disclaimer, the term of this patent is extended or adjusted under 35 U.S.C. 154(b) by 0 days.

(21) Appl. No.: 17/903,285

(22) Filed: Sep. 6, 2022

(51) Int. Cl.
G06F 3/14 (2006.01)
H04N 5/40 (2006.01)
H04N 13/363 (2018.01)

(52) U.S. Cl.
CPC .......... G06F 3/14 (2013.01); H04N 5/40 (2013.01); H04N 13/363 (2018.05)

(58) Field of Classification Search
CPC ....................................................... G06F 3/14
See application file for complete search history.

(56) References Cited

U.S. PATENT DOCUMENTS

2003/0016247 A1* 1/2003 Lai ........................... G06F 3/14
715/764
2020/0225903 A1* 7/2020 Cohen ..................... G09G 5/12

* cited by examiner

Primary Examiner — Gustavo Polo
(74) Attorney, Agent, or Firm — CALDWELL INTELLECTUAL PROPERTY LAW

(57) ABSTRACT

An apparatus and method for creating a modular digital wall. The apparatus including at least a processor; and a memory communicatively connected to the processor, the memory containing instructions configuring the at least a processor to: generate a graphical user interface, wherein the graphical user interface includes a modular digital wall; receive a plurality of graphical data; process the plurality of graphical data; input the plurality of graphical data onto the modular digital wall; receive a user input; and modify the modular digital wall as a function for the user input.

18 Claims, 7 Drawing Sheets

APPARATUSES AND METHODS FOR GENERATING A MODULAR DIGITAL WALL

FIELD OF THE INVENTION

The present invention generally relates to the field of graphical user interfaces. In particular, the present invention is directed to apparatuses and methods for generating a modular digital wall.

BACKGROUND

Physical art wall planning requires strenuous manual manipulation of materials to plot to a wall. There is a need for an automatized system of plotting, planning, and editing an art wall.

SUMMARY OF THE DISCLOSURE

In an aspect, an apparatus for generating a modular digital wall, the apparatus including at least a processor; and a memory communicatively connected to the processor, the memory containing instructions configuring the at least a processor to: generate a graphical user interface, wherein the graphical user interface includes a modular digital wall; receive a plurality of graphical data; process the plurality of graphical data; input the plurality of graphical data onto the modular digital wall; receive a user input; and modify the modular digital wall as a function for the user input.

In another aspect, a method for generating a modular digital wall, the method including generating, by processor, a graphical user interface, wherein the graphical user interface includes a modular digital wall; receiving, by the processor, a plurality of graphical data; processing, by the processor, the plurality of graphical data; input the plurality of graphical data onto the modular digital wall; receiving, by the processor, a user input; and modifying, by the processor, the modular digital wall as a function for the user input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods of creating a modular digital wall. In an embodiment, a modular digital wall may be plotting wall for a quilt.

Aspects of the present disclosure can be used to plan and plot numerous designs for artwork, apparel, and other physical items. Aspects of the present disclosure can also be used to digital edit and manipulate physical items to be transformed into physical artwork, apparel, and other items.

Exemplary embodiments illustrating aspects of the present disclosure are described below in the context of several specific examples.

Figure 1:
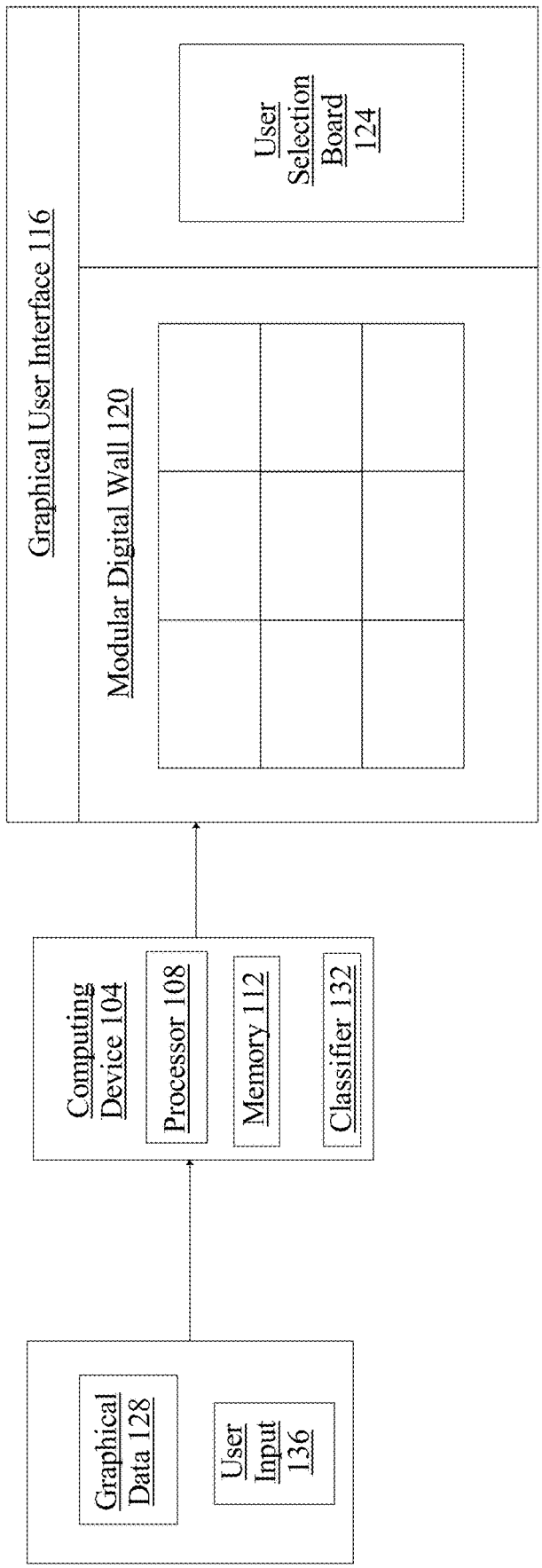
FIG. 1 is an exemplary embodiment of an apparatus for creating a modular digital wall.

Referring now to FIG. 1, an exemplary embodiment of an apparatus 100 for generating a modular digital wall is illustrated. Apparatus 100 includes a computing device 104. Computing device 104 includes a processor 108 and a memory 112 communicatively connected to the processor 108, wherein memory 112 contains instructions configuring processor 108 to carry out the generating process. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, additionally, computing device 104 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Still referring to FIG. 1, computing device is configured to generate a graphical user interface 116 including a modular digital wall 120. The graphical user interface 116 may be configured to allow a user to edit a modular digital wall 120. A "graphical user interface," as used in this disclosure is a set of one or more pictorial icons corresponding to one or more computer actions. A "user," as used in this disclosure, is a person operating a graphical user interface. Graphical user interface 116 may be displayed on a display device, such as a computer monitor, smartphone, tablet, TV, and the like. A "modular digital wall," as used in this disclosure is a digital interactive template. Modular digital wall 120 may include a grid pattern (e.g., 3×3, 4×4, 5×5, 4×5, 3×4). A "grid pattern," as used in this disclosure, is a sequence of columns and rows. The application of a grid pattern may allow designs on modular digital wall 120 to be divided into multiple shapes varying in size that may help a user organize graphical data 128. In some embodiments, the grid pattern may contain windows, slots, squares, columns, modules and the like. In some embodiments, the shapes in a grid pattern may be triangles, rectangles, circles, trapezoids, or the like. In some embodiments, GUI 116 may include a user selection board 124. A "user selection board," as used in this disclosure, is a tool bar to modify a modular digital wall. For example, user selection board 124 may include a user input 136 field, wherein a user may "click and drag" items and/or modify modular digital wall 120. A user may select the size of the modular digital wall 120 in its entirety. A user may also select sizing of shapes in the grid pattern. For example, in a square grid pattern, each square may be a different size. Modular digital wall 120 may be designed to resemble shapes a plurality of graphical data 128 may be made into. As non-limiting examples, modular digital wall 120 may resemble a quilt, blanket, jacket, rug, sweater, wall art (e.g. framed collages, wallpaper, etc.), curtains, mug, dish, apparel, office supplies (e.g., mouse pad, laptop cover, seat covering, etc.) vehicle apparel (e.g., seat covers, floor mats, etc.), and the like. "Graphical data," as used in this disclosure, is a digital representation of an item. In a quilt embodiment, modular digital wall 120 may include a sashing, a block, a cornerstone, a trim, and other quilt components a user may select to add. For example, a quilt grid pattern may be broken down into 3×4 squares, which may include graphical data 128 representing a jersey (a jersey square). A user my edit each jersey square to include a certain quilt sashing style. "Quilt sashing, "as used in this disclosure, are strips of fabric (plain or patchwork) that divide quilt blocks from each other. The strips may have squares or other types of patchwork adjacent to the corners of quilt blocks. For example, a quilt sashing style may include a color, fabric type, thread count, and the like of the fabric used to frame each pieced block of a quilt. In some embodiments, modular digital wall 120 may also display the texture such a fabric and/or material. For example, in a quilt embodiment, the grid pattern may display the texture of cotton, wool, flannel, and the like.

Still referring to FIG. 1, computing device 104 is configured to receive a plurality of graphical data 128. Graphical data 128 may include greyscale, color, outlines, video footage, images, screenshots, and the like. Graphical data 128 may represent images of clothing and wearable items such as, as non-limiting examples, jerseys, gloves, pants, hats, coats shoes, socks, bracelets, headbands, and other forms of apparel. In some embodiments, the plurality of graphical data 128 may be received from a sensor. A "sensor," as used in this disclosure, a device which detects and records a property. Sensor may detect and record a visual property such as an image or a video. A sensor may include a camera, UV sensors, IR sensors and the like. In some embodiments, the sensor may be communicatively connected to computing device 104. In some embodiments, computing device 104 may receive the plurality of graphical data 128 from a user database communicatively connected to computing device 104. As used in this disclosure, a "user database," is a data structure containing a plurality of graphical data 128. A user may upload graphical data 128 to the user database for computing device 104 to receive. The user database may be implemented, without limitation, as a relational the user database, a key-value retrieval the user database such as a NOSQL the user database, or any other format or structure for use as the user database that a person skilled in the art would recognize as suitable upon review of the entirety of this disclosure. The user database may alternatively or additionally be implemented using a distributed data storage protocol and/or data structure, such as a distributed hash table or the like. The user database may include a plurality of data entries and/or records as described above. Data entries in the user database may be flagged with or linked to one or more additional elements of information, which may be reflected in data entry cells and/or in linked tables such as tables related by one or more indices in a relational the user database. Persons skilled in the art, upon reviewing the entirety of this disclosure, will be aware of various ways in which data entries in the user database may store, retrieve, organize, and/or reflect data and/or records as used herein, as well as categories and/or populations of data consistently with this disclosure.

Still referring to FIG. 1, computing device 104 is configured to process the plurality of graphical data 128. Processing may include digital processing techniques such as acquisition, image enhancement, image restoration, color image processing, data augmentation, wavelets and multi-resolution processing, image compression, morphological processing, representation and description, object and recognition, and the like. In some embodiments, processing the plurality of graphical data 128 includes utilizing feature extraction. Feature extraction is a part of computer visions, in which, an initial set of the raw data is divided and reduced to more manageable groups. "Features," as used in this disclosure, are parts or patterns of an object in an image that help to identify it. For example a square has 4 corners and 4 edges, they can be called features of the square. Features may include properties like corners, edges, regions of interest points, ridges, etc. In some embodiments, processing the plurality of graphical data 128 may include segmenting an image of the plurality of graphical data 128 utilizing image segmentation. "Image segmentation," as used in this disclosure, is a sub-domain of computer vision and digital image processing, as describe further below, which aims at grouping similar regions or segments of an image under their respective class labels. For example, graphical data 128 may be an image showing multiple sports jerseys in one photo with random objects in the background, such as a bed, lamp, shoes on the floor etc. Computing device 104 may process graphical data 128 to extract and group content of the photo to pull only the sports jerseys of the image and transmit onto the modular digital wall 120. In some embodiments, digital processing may include reformatting and/or resizing graphical data 128 to fit the shape and/or dimensions and the modular digital wall 120. For example, in a quilt grid pattern embodiment, an image of a sports jersey may be cropped and resized to emphasis the number on the jersey when formatted into the gird pattern. In some embodiments, a user may reformat an image to fit modular digital wall 120 manually. For example, cropping, resizing, and the like.

Still referring to FIG. 1, in some embodiments, apparatus 100 may include a machine vision system that includes at least a camera. A machine vision system may be implemented in apparatus 100 for digital processing methods as described above. A machine vision system may use images from at least a camera, to make a determination about a scene, space, and/or object. For example, in some cases a machine vision system may be used for world modeling or registration of objects within a space, such as graphical data 128. In some cases, registration may include image processing, such as without limitation object recognition, feature detection, edge/corner detection, and the like. In some embodiments, apparatus 100 may utilize the machine vision system to parse visual content and classify an object in graphical data 128 to a defined category. For example, the system may find a security blanket among all objects in an image. In some embodiments, apparatus 100 may utilize the machine vision system to parse visual content and identify a particular object in graphical data 128. For example, the system may find a pink security blanket among a plurality of multi-colored security blankets in an image. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure. In some embodiments, the machine vision system may be used to aid a classifier, such as classifier 132 as described further below, by generating models of graphical data 128 for classification purposes. For example, the machine vision system may utilize a pattern recognition based algorithm, wherein a classifier is trained by exemplary sets of graphical data 128, such as a plurality of scarfs, to identify patterns that are similar to all scarfs and create a "model scarf" that the classifier may use to accurately detect and categorize scarfs in graphical data 128 received from a user or a database.

Still referring to FIG. 1, in some embodiments, apparatus 100 may use optical character recognition to parse text, symbols, and the like from graphical data 128. Data extracted from graphical data may be used in classifier 132 as described further below. For example, optical character recognition may be used to recognize the names and numbers on a plurality of sports jerseys. Optical character recognition may also be used to distinguish text and symbols in graphical data 128. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described throughout this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught throughout this disclosure.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, computing device 104 is configured to input the plurality of graphical data 128 onto the modular digital wall 120. Inputting the plurality of graphical data 128 may include a user manually clicking and dragging graphical data 128 onto modular digital wall 120 from user selection board 124. For example, GUI 116 may display the plurality of graphical data 128 in user selection board 124 displayed next to modular digital wall 120 a user may select and drag from. In some embodiments, inputting the plurality of graphical data 128 may include utilizing a classifier 132. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier 132 may be configured to output at least a datum that labels or otherwise identifies a set of data that are clustered together, found to be close under a distance metric as described below, or the like. Computing device 104 and/or another device may generate a classifier 132 using a classification algorithm, defined as a process whereby a computing device 104 derives a classifier 132 from training data. For example, classifier 132 may receive a plurality of graphical data 128 and/or a plurality of processed graphical as a described above, as an input and output graphical data 128 onto modular digital wall 120. Training data may include graphical data models/data received from the machine visions system and data extracted using optical character recognition. In some embodiments, training data may include examples of modular digital walls correlated to a score. In some embodiments, training data may include exemplary modular digital walls representing a "good" classification of data onto a digital wall and a bad classification of data onto a digital wall. For example, a good modular digital wall 120 may display proper ordering, cropping, sizing, placement, and the like of the plurality of graphical data 128 onto a modular digital wall 120. For example, ordering placement of images based on jersey numbering, color schemes, and the like. A bad modular digital wall 120 may represent improper ordering, cropping, sizing, placement, and the like of the plurality of graphical data 128 onto a modular digital wall 120. For example, off centered placement of jersey numbers, awkward sizing of items, distasteful arrangement of color schemes, and the like. In some embodiments, training data may contain user feedback on the arrangement of graphical data 128. User feedback may be open ended, such as comments submitted by a user. User feedback may be a rating of modular digital walls 120 generated by classifier indicating a user's level of satisfaction. In some embodiments, training data may be received from the user database. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, in some embodiments, classifier 132 may be configured to output a digital wall draft. As used in this disclosure, a "digital wall draft" is digital wall containing graphical automatedly generated by a computing device. Classifier 132 may be configured to classify graphical data 128 and output a digital wall draft based on color. For example, classifier 132 may output graphical data 128 arrangement based on monochromatic color palette. This may include the grouping or exclusion of graphical data 128 based on color. Training data may include models of Monochromatic Color Palettes, Analogous Color Palettes, Complementary Color Palettes, Triadic Color Palettes, hue, saturation, chroma, value, shade tone, tint, and the like. Models may be received from the machine vision system as described above.

Still referring to FIG. 1, in some embodiments, classifier 132 may be configured to classify graphical data 128 and output a digital wall draft based on size. For example, classifier 132 may arrange graphical data 128 based on dimension, scaling, and the like. This may include cropping, maximizing, shrinking, and formatting graphical data 128 to fit the dimensions of the digital wall gird pattern. In some embodiments, this may include emphasizing areas of graphical data 128 to fit in a section of the grid pattern. For example an image of a letterman jacket may be too large to fit in a grid pattern. Classifier 132 may crop the image to emphasize the school logo on the jacket to fit the grid pattern. In some embodiments, sizing may include minimizing wasted space in in graphical data 128. For example, a plurality of images representing jackets may have varying aspect ratios, wherein classifier 132 may resize the images to be evenly matched on the grid pattern. Training data may include optical character recognition data and machine vision data as described above. Training data may also include models of aspect ratios.

Still referring to FIG. 1, in some embodiments, computing device 104 may use a sizing algorithm to locate graphical data 128 onto modular digital wall 120. For the purposes of this disclosure a "sizing algorithm" is an algorithm configured to minimize wasted space on a modular digital wall. As a non-limiting example, if most of the graphical data 128 is in a 4:3 aspect ratio, but one portion of graphical data 128 is in a 16:10 aspect ratio, the graphical data 128 with the 16:10 aspect ratio may have wasted space around it. Sizing algorithm may operate to optimize the sizing and positioning of graphical data 128 on modular digital wall 120 to minimize wasted space. In some embodiments, sizing algorithm may calculate the wasted space on modular digital wall and iteratively update the sizing, positioning, and/or orientation of graphical data 128 to minimize the wasted space. In some embodiments, sizing algorithm may include a loss function. A "loss function" is an expression of an output of which an optimization algorithm minimizes to generate an optimal result. In some embodiments, using sizing algorithm to minimize wasted space may include minimizing a loss function.

Still referring to FIG. 1, in some embodiments, classifier 132 may be configured to classify graphical data 128 and output a digital wall draft based on subject matter. Subject matter may be broad such as images related to a theme (school, sports, arts, and the like). Subject matter may be specific or narrow such as text or symbols related to baseball. In another example, graphical data may be grouped chronologically, such grouping graphically data 128 related to a school theme based on grade level (e.g., middle school, high school, college, and the like). Training data may include optical character recognition data and machine vision data as described above.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 is configured to receive user input 136. "User input," as used in this disclosure, is input received from user. User input 136 may be received through user selection board 124. In some embodiments, user input 136 may include a modification to an orientation of the plurality of graphical data 128 onto the modular digital wall 120. User input 136 may include a selection of data, interaction with GUI 116, and edits to modular digital wall 120 described throughout this disclosure. In an embodiment, user input 136 may include the selection and orientation of graphical data 128. For example, a user may select images out of a plurality of images received by computing device 104 to be placed on digital wall 120. This may include the ordering and sizing of images onto the grid pattern. For example, user input 136 may be the ordering of numbered sport jersey images onto digital wall 120 from left to right based on the jersey number displayed from low to high (e.g., jersey number order from 1-10). In some embodiments, user input 136 may include cropping graphical data 128 to a desired shape and size. For example, a user may crop an image of a jersey to emphasis text/symbols displayed on the jersey. In another example, the user may re-shape the image from a square into a star shape to be displayed on digital wall 120. In some embodiments, user input 136 may include digital processing of graphical data 128 as described above. As a non-limiting example, a user may identify, select, crop out, group, enhance, re-color, and resize a plurality of jerseys extracted from a singular image to be displayed on digital wall 120. In some embodiments, user input 136 may include the rearrangement of the plurality of graphical data 128 displayed on digital wall 120. For example, computing device 104 may auto-fill/auto-generate a digital wall 120 as described above, wherein a user may edit, redo, re-order, re-size, and the like the auto-filled digital wall 120. In some embodiments, user input 136 may include the addition of text, symbols, images, and the like to be added or overlayed over graphical data 128 on digital wall 120. For example, a digital wall 120 may be overlayed with text, such as a person's name. A user may additionally select the size, orientation, placement, color, and formatting. In another example, graphical data 128 on digital wall 120 may be overlayed with a digital image, such as a graphical data 128 of jersey being overlayed with the symbol of baseball bat. In some embodiments, user input 136 may include the selection of texture of the digital wall 120. For example, the first texture displayed may be of cotton wherein user input 136 is the change from cotton to wool. In some embodiments, user input 136 may be the selection of a digital wall 120 draft as described above. This may include switching digital wall 120 drafts by the user. In some embodiments user input 136 may be implemented through a "click and drag" from a data structure such as selection board 124. "Clicking and dragging," as used herein, is a way to move certain objects on the screen. For example, placing a cursor over data to be selected in selection board 124 and dragging data in to place on digital wall 120. In some embodiments, user input may be implemented through a menu function such as a drop-down menu. A "drop-down menu, as used herein, is a list of choices that appears on a graphical user interface when a person clicks on a menu's title. For example, GUI 116 may provide a menu title, wherein through a drop down list a user may select a digital wall draft.

Still referring to FIG. 1, computing device 104 is configured to modify the modular digital wall 120 as a function for the user input 136. For example, changing the texture of the modular digital wall 120 from wool to cotton. In some embodiments, modifying the modular digital wall 120 as a function of the user input 136 may include displaying a change in frames from a first orientation of the plurality of graphical data 128 to a second orientation of the plurality of graphical data 128. The change in frame may be referred to as a frame rate in this disclosure. A "frame," as used herein single image in a sequence of pictures. The frame is a combination of the image and the time of the image when exposed to the view. A "frame rate," as used herein, is s the frequency (rate) at which consecutive images (frames) are captured or displayed. The term applies equally to film and video cameras, computer graphics, and motion capture systems. Frame rate may also be called the frame frequency and be expressed in hertz. The frame rate may be at a speed suitable to a allow a user to visually comprehend and process changes made to modular digital wall 120. For example the changes in frames on GUI 116 may be at frame rates such as 60 Hz, 100 Hz, 120 Hz, and the like. For example, in quilt embodiment, the change in frame may be a slow transition from the first orientation displaying a first quilt pattern to a second pattern displaying a second quilt pattern based on user input 136.

Figure 2:
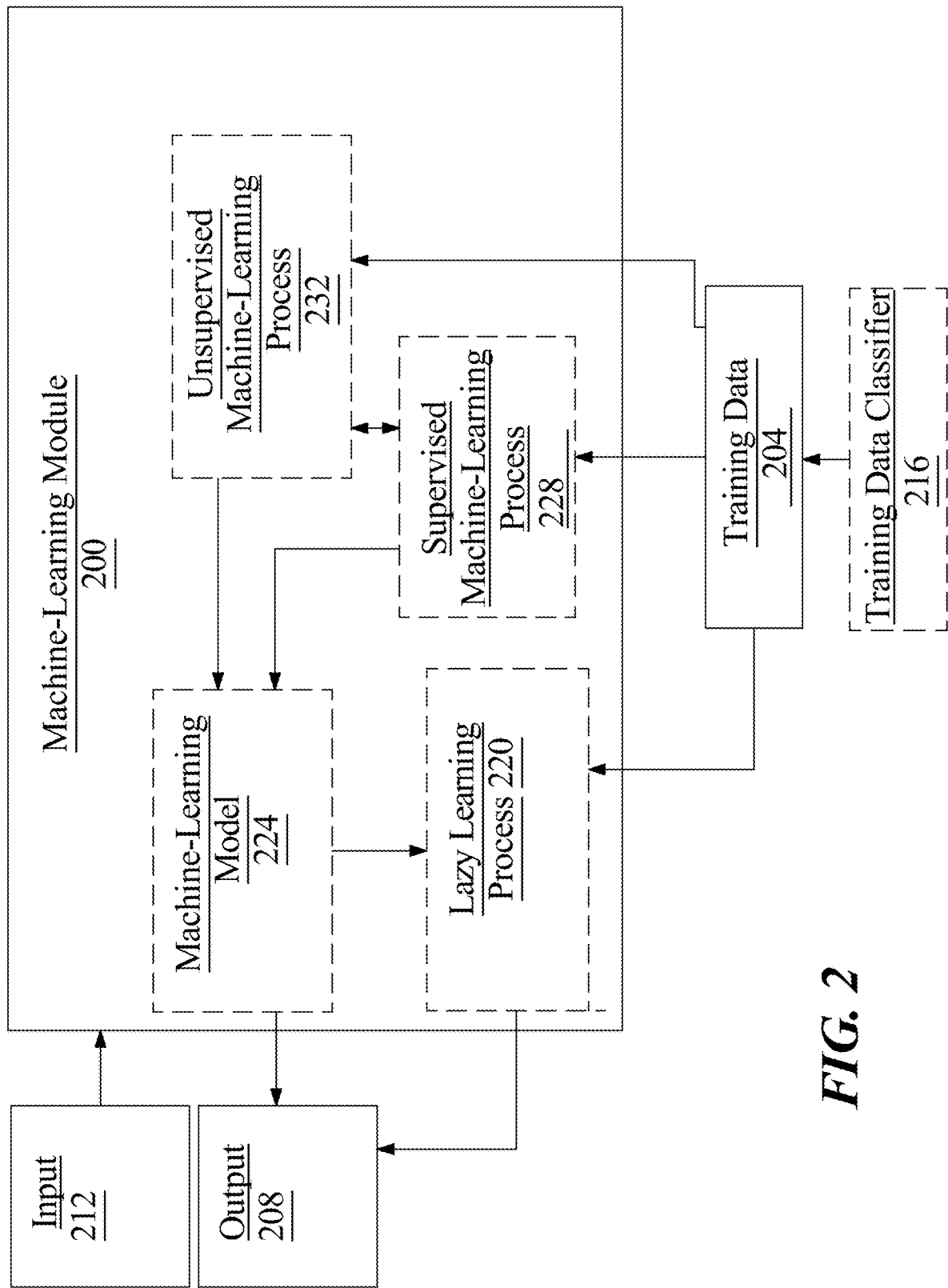
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data

204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
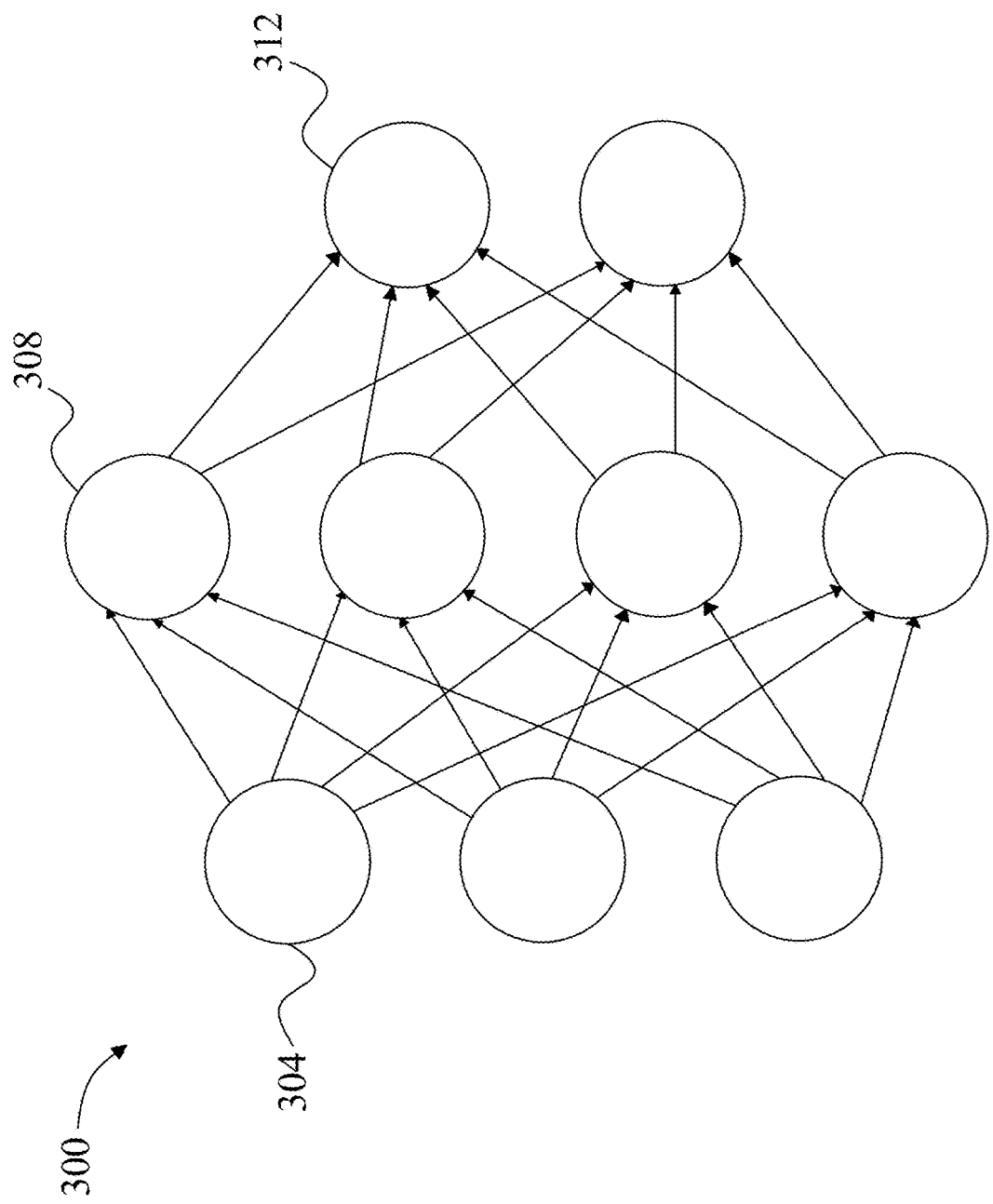
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network including an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
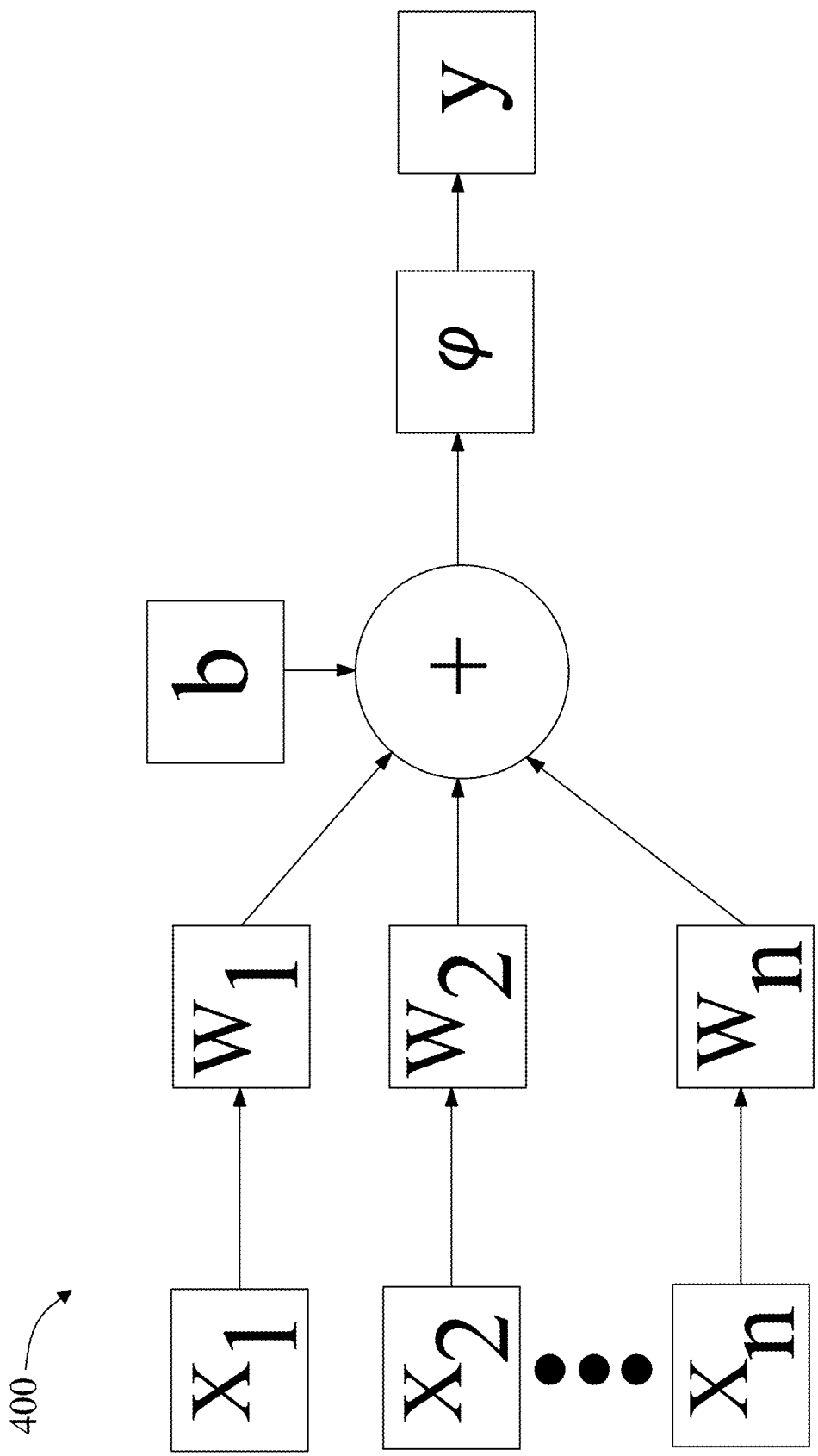
FIG. 4 is a diagram of an exemplary embodiment of a node of a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
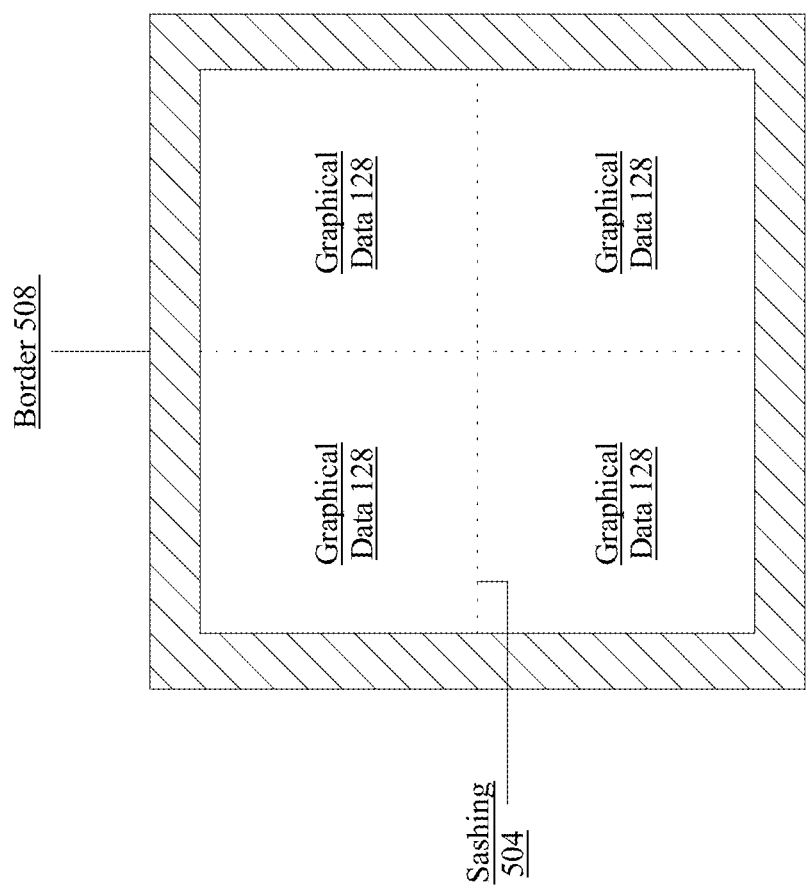
FIG. 5 is an exemplary embodiment of a quilt modular digital wall.

Referring now to FIG. 5 is an exemplary embodiment of a modular digital wall 120 for a quilt. Modular digital wall 120 for the quilt may contain a plurality of graphical data 128. Modular digital wall 120 for the quilt may include components of an average quilt. For example, digital wall 120 may include a 2×2 square grid pattern divided by a quilt sashing style 504 and outlined by a border 508. Each square in the grid pattern may represent graphical data 128 as described above. In some embodiments, modular digital wall 120 may include a sashing 504, border 508, corner stone, binding, backing, batting, post, block, top, sleeve, block patten, and the like. Elements of digital wall 120 may be added by user input or through menu selection as described above with reference to FIG. 1. In some embodiments, classifier 132 may be used to generate a digital wall draft of a quilt embodiment. In some embodiments, a user may select components of modular digital wall 120 for the quilt from user selection board.

Figure 6:
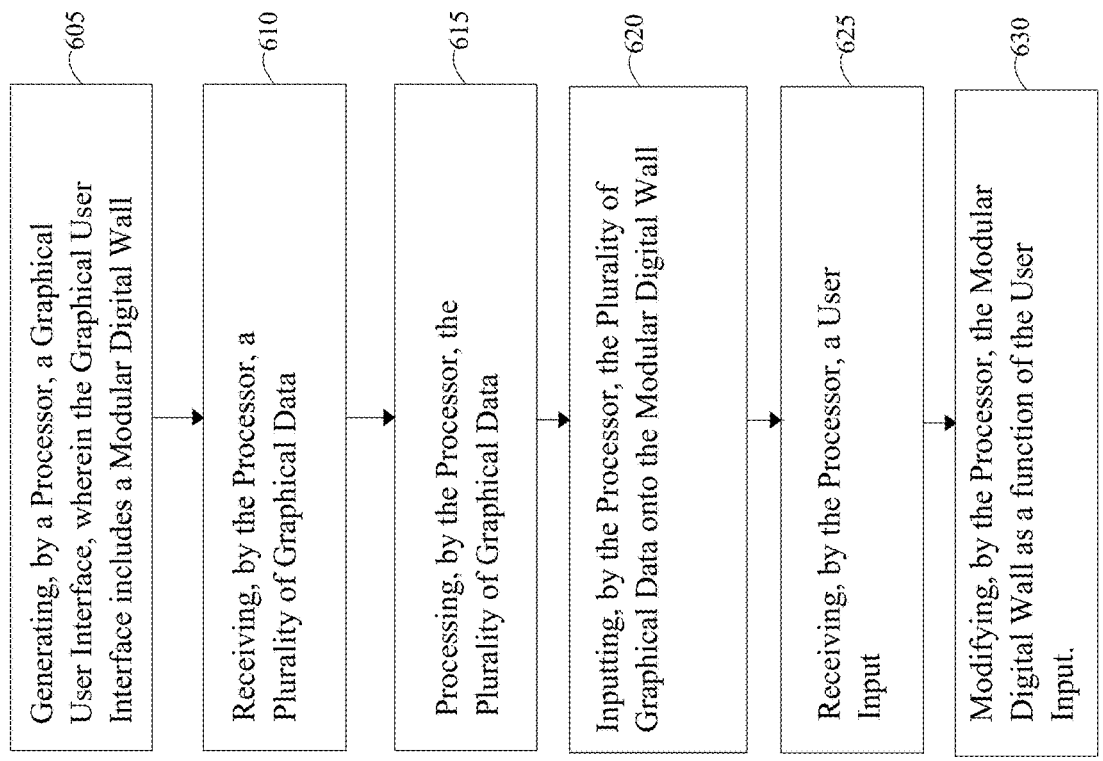
FIG. 6 is an exemplary flow diagram of a method for generating a modular digital wall.

Referring now to FIG. 6, an exemplary flow diagram of a method 600 for generating a modular digital wall is shown. At step 605, method 600 includes generating, by processor, a graphical user interface, wherein the graphical user interface includes a modular digital wall. This may be implemented as disclosed with reference to FIGS. 1-5. In some embodiments, the modular digital wall may include a grid pattern. In some embodiments, the modular digital wall may include quilt sashing. At step 610, method 600 includes receiving, by the processor, a plurality of graphical data. This may be implemented as disclosed with reference to FIGS. 1-5. In some embodiments, the plurality of graphical data may be received from a sensor. In some embodiments, the plurality of graphical data may include a plurality of images of clothing. At step 615, method 600 includes processing, by the processor, the plurality of graphical data. This may be implemented as disclosed with reference to FIGS. 1-5. In some embodiments, processing, by the processor, the plurality of graphical data may include segmenting an image of the plurality of graphical data. In some embodiments, processing, by the processor, the plurality of graphical data may include extracting a feature from an image of the plurality of graphical data. At step 620, method 600 includes inputting by the processor, the plurality of graphical data onto the modular digital wall. This may be implemented as disclosed with reference to FIGS. 1-5. In some embodiments, inputting, by the processor, the plurality of graphical data may include a classifier. At step 625, method 600 includes receiving, by the processor, a user input. This may be implemented as disclosed with reference to FIGS. 1-5. In some embodiments, the user input may include a modification to an orientation of the plurality of graphical data in the modular digital wall. At step 630, method 600 includes modifying, by the processor, the modular digital wall as a function for the user input. This may be implemented as disclosed with reference to FIGS. 1-5. In some embodiments, modifying, by the processor, the modular digital wall as a function of the user input may include displaying a change in frames from a first orientation of the plurality of graphical data to a second orientation of the plurality of graphical data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
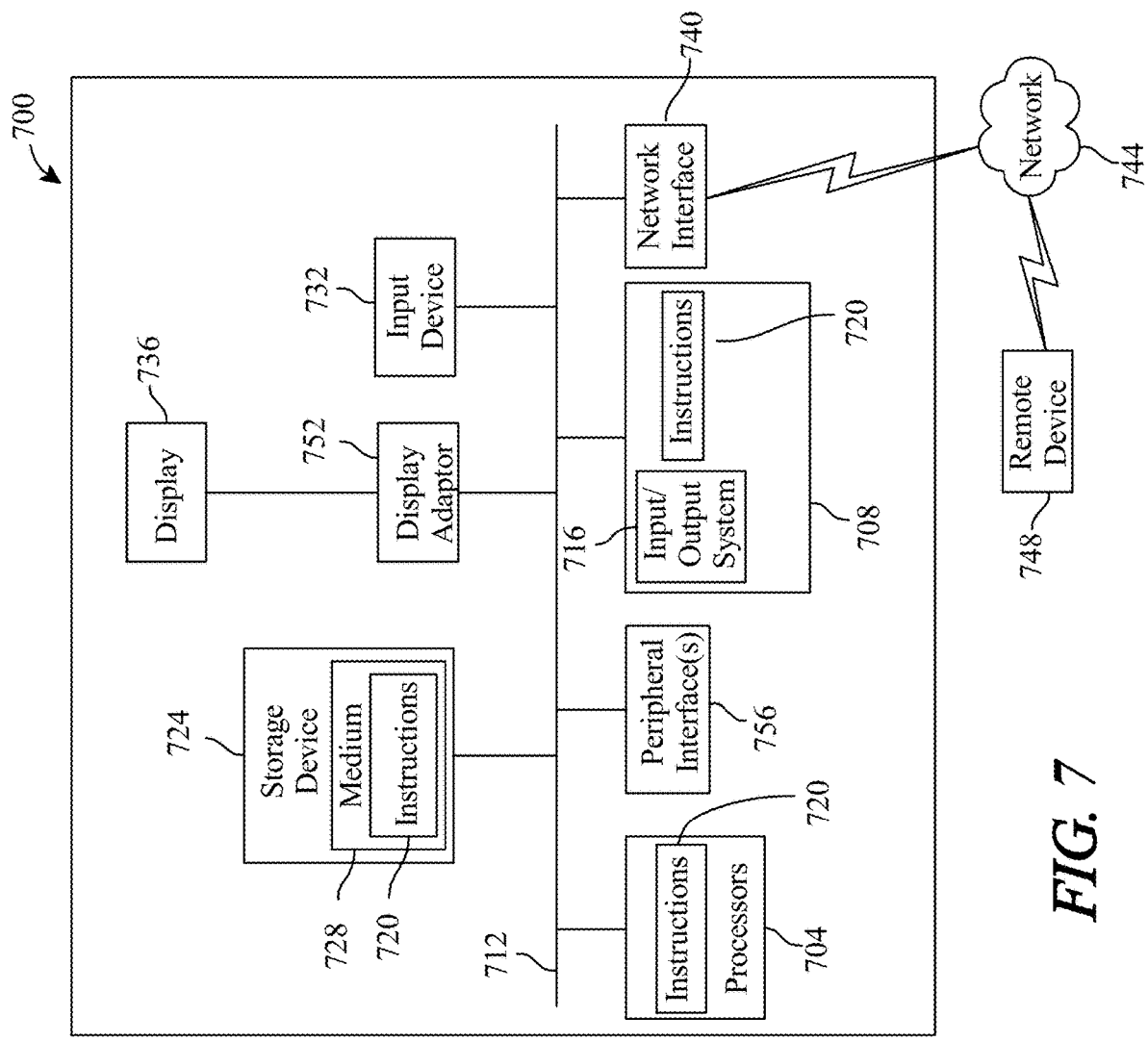
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a modular digital wall, the apparatus comprising:
    at least a processor; and
    a memory communicatively connected to the processor, the memory containing instructions configuring the at least a processor to:
        generate a graphical user interface, wherein the graphical user interface comprises a modular digital wall;
        receive a plurality of graphical data;
        process the plurality of graphical data;
        input the plurality of graphical data onto the modular digital wall, wherein inputting the plurality of graphical data onto the modular digital wall comprises utilizing a classifier to output a digital wall draft;
        receive a user input; and
        modify the modular digital wall as a function of the user input.

2. The apparatus of claim 1, wherein receiving a plurality of graphical data comprises receiving a plurality of graphical data from a sensor.

3. The apparatus of claim 1, wherein the plurality of graphical data comprises a plurality of images of clothing.

4. The apparatus of claim 1, wherein processing the plurality of graphical data comprises segmenting an image of the plurality of graphical data.

5. The apparatus of claim 1, wherein processing the plurality of graphical data comprises extracting a feature from an image of the plurality of graphical data.

6. The apparatus of claim 1, wherein the modular digital wall comprises a grid pattern.

7. The apparatus of claim 1, wherein the modular digital wall contains quilt sashing.

8. The apparatus of claim 1, wherein the user input comprises a modification to an orientation of the plurality of graphical data in the modular digital wall.

9. The apparatus of claim 1, wherein modifying the modular digital wall as a function of the user input comprises displaying a change in frames from a first orientation of the plurality of graphical data to a second orientation of the plurality of graphical data.

10. A method for generating a modular digital wall, the method comprising:
    generating, by a processor, a graphical user interface, wherein the graphical user interface comprises a modular digital wall;
    receiving, by the processor, a plurality of graphical data;
    processing, by the processor, the plurality of graphical data;
    inputting, by the processor, the plurality of graphical data onto the modular digital wall, wherein inputting the plurality of graphical data onto the modular digital wall comprises utilizing a classifier to output a digital wall draft;
    receiving, by the processor, a user input; and
    modifying, by the processor, the modular digital wall as a function of the user input.

11. The method of claim 10, wherein receiving, by the processor, a plurality of graphical data comprises receiving a plurality of graphical data from a sensor.

12. The method of claim 10, wherein the plurality of graphical data comprises a plurality of images of clothing.

13. The method of claim 10, wherein processing, by the processor, the plurality of graphical data comprises segmenting an image of the plurality of graphical data.

14. The method of claim 10, wherein processing, by the processor, the plurality of graphical data comprises extracting a feature from an image of the plurality of graphical data.

15. The method of claim 10, wherein the modular digital wall comprises a grid pattern.

16. The method of claim 10, wherein the modular digital wall contains quilt sashing.

17. The method of claim 10, wherein the user input comprises a modification to an orientation of the plurality of graphical data in the modular digital wall.

18. The method of claim 10, wherein modifying, by the processor, the modular digital wall as a function of the user input comprises displaying a change in frames from a first orientation of the plurality of graphical data to a second orientation of the plurality of graphical data.

* * * * *